United States Patent [19]

Kato

[11] 4,010,918
[45] Mar. 8, 1977

[54] AUTOMATIC REVERSAL MECHANISM

[75] Inventor: Saburo Kato, Yokohama, Japan

[73] Assignee: Ricoh Co., Ltd., Japan

[22] Filed: Nov. 3, 1975

[21] Appl. No.: 628,320

[30] Foreign Application Priority Data

Nov. 6, 1974 Japan .......................... 49-127668

[52] U.S. Cl. .............................. 242/191; 242/204
[51] Int. Cl.² ...................... G03B 1/04; G11B 15/32
[58] Field of Search ... 242/201, 186, 187, 189–191, 242/204, 202, 207, 210; 360/71, 74

[56] References Cited

UNITED STATES PATENTS

| | | | |
|---|---|---|---|
| 3,653,607 | 4/1972 | Lambeek et al. | 242/191 |
| 3,690,591 | 9/1972 | Opelt | 242/204 |
| 3,759,463 | 9/1973 | Yoshii | 242/186 |
| 3,946,966 | 3/1976 | Kamatsu et al. | 242/191 |

*Primary Examiner*—Leonard D. Christian
*Attorney, Agent, or Firm*—McGlew and Tuttle

[57] ABSTRACT

The mechanism is primarily for use in the tape drive of a tape recorder for automatically reversing direction of rotation of a pair of rotating members and/or stopping such members through mechanical detection of a sudden variation of load which may occur at the end of taking-up of a tape. A drive roller is supported on a swingable arm for swinging motion to be brought into peripheral engagement with a selected one of the pair of rotating members. Mechanism is provided for causing the swinging motion of the drive roller upon the reversal of rotation of the latter to change its engagement with the rotating members from one to the other. An engaging member is supported concentrically with, and for relative rotation by a predetermined angle to, each rotating member and a coil spring is connected therebetween. The relative rotation of an amount beyond a predetermined value, which is caused by an increase of load, causes the reversal of direction of rotation of the drive roller through actuating mechanism for an electrical switch which controls a drive motor for the drive roller.

5 Claims, 5 Drawing Figures

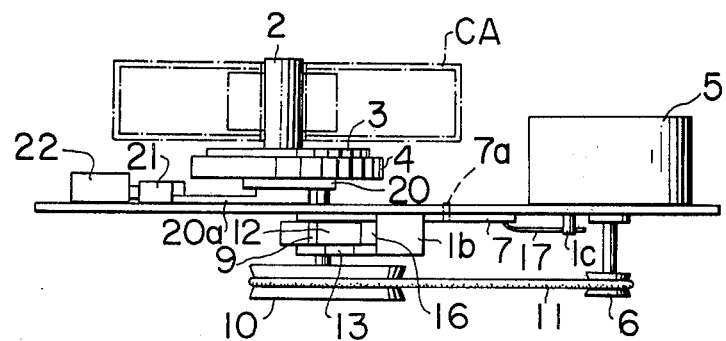
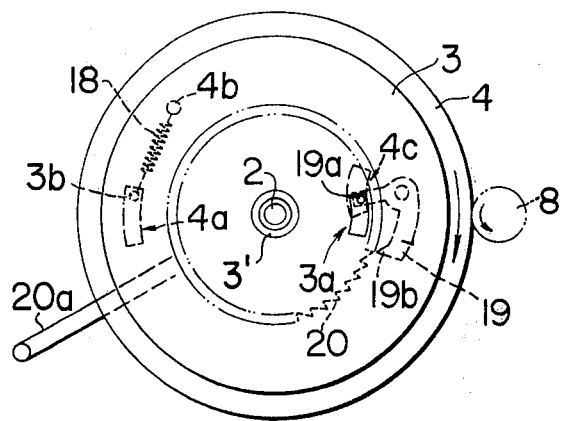
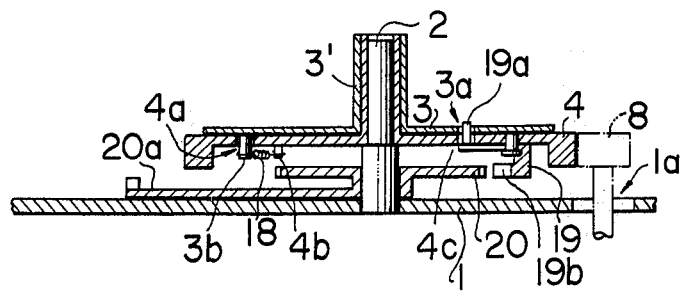

AUTOMATIC REVERSAL MECHANISM

BACKGROUND OF THE INVENTION

The invention relates to an automatic reversal and stop mechanism primarily for use in the tape drive of a tape recorder for automatically reversing direction of rotation of rotating members and/or stopping such members during their operation.

As is well recognized, a tape recorder is generally provided with drive means which is adapted to drive a capstan roller or tape reel in either forward or reverse direction, and the drive means internally includes means for starting, stopping or reversing rotating members. Considering a tape reel drive for a cassette tape recorder, a control mechanism for automatically reversing or stopping rotary members generally comprises means for sensing the tape end in some way, including applying a marking member such as a silver paper to the tape end or previously recording a particular electrical signal thereon. However, a separate provision of sensing means adds to the complexity of the mechanism.

It is also known to detect a sudden increase in the tape tension at the end of taking up the tape. At this end, a sensing member such as a roller or plunger is maintained in sliding contact with a travelling tape so that it may be ejected in response to the sudden increase in the tape tension when the tape end is reached, thereby producing a displacement which can be utilized to operate on an actuator of a switch, for example. While this results in a substantial simplification of construction, it still requires a space for the provision of elements which are used to detect and utilize the displacement, and additionally, the power dissipation increases also, both of which stand in the way of the miniaturization of the apparatus.

SUMMARY OF THE INVENTION

It is an object of the invention to provide an automatic reversal and stop mechanism which avoids the above-mentioned drawbacks of the prior art while eliminating the provision of a separate member for detecting the tension in the tape, by utilizing a reaction on a transmission element which occurs in response to an increase in the tape tension for directly operating a motor switch and switching a transmission element, thus enabling a miniaturization of the apparatus.

BRIEF DESCRIPTION OF THE DRAWINGS

FIG. 2 is a side elevation view;

FIG. 3 is a fragmentary plan view of an engaging wheel and a driven wheel shown in FIG. 1;

FIG. 4 is a side elevation view of the parts shown in FIG. 3; and

DETAILED DESCRIPTION OF EMBODIMENT

Figure 1:
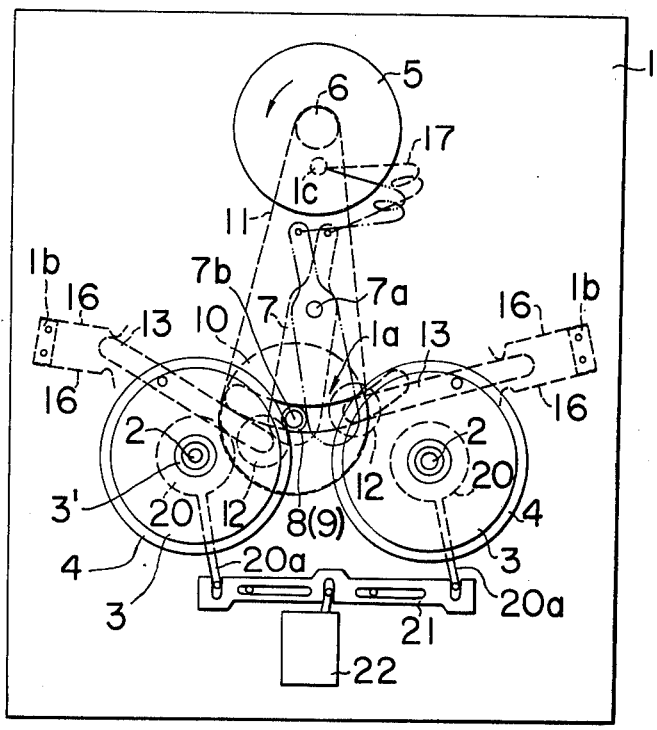
FIG. 1 is a schematic plan view of the automatic reversal and stop mechanism constructed in accordance with one embodiment of the invention.

Referring to FIGS. 1 and 2, there is shown a drive mechanism of a cassette tape recorder which incorporates the automatic reversal and stop mechanism according to the invention. The mechanism includes a base 1 on which a pair of spaced shafts 2 are mounted, carrying a pair of engaging wheels 3. Each of the engaging wheels 3 is in the form of a disc attached with a hollow shaft 3', on which are fitted the hubs of respective reels which are internally housed within a cassette CA which is adapted to be loaded into the tape recorder. The engaging wheels 3 engage respective driven wheels 4 located concentrically and in contact with the lower surface thereof and having a peripheral surface formed of a rubber-like material, and they rotate integrally under normal tape load.

Figure 5:
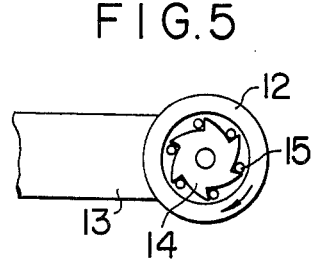
FIG. 5 is a schematic illustration of an idler wheel.

A motor 5 is mounted on the upper surface of the base 1 adjacent to its one end, and has its output shaft extending through the base 1 and provided with a belt pulley 6. An oscillating arm 7 is pivotally mounted at 7a on the underside of the base at a position intermediate the motor 5 and the engaging wheels 3. The end of the oscillating arm 7 which is located nearer the driven wheels 4 extends into the clearance between the opposing peripheries of both driven wheels 4, and carries a vertical pin 7b extending through an arcuate opening 1a formed in the base 1 and on which a drive wheel 8, in the form of a rubber roller is mounted above the base 1 and on which a friction roller 9 and a flywheel 10 are mounted below the base 1. The other end of the oscillating arm 7 has a reduced width, and is engaged by one end of a spring 17, the other end of which is secured to a pin 1c on the base 1, whereby the oscillating arm 7 is biased for oscillation about a neutral point which is represented by a vertically extending line, as viewed in FIG. 1. The drive wheel 8 is located at the same elevation as the driven wheels 4, and the flywheel 10 is peripherally formed with a belt receiving groove, which is engaged by a flexible rubber belt 11 extending around the flywheel 10 and the pulley 6.

a pair of laterally spaced arms 13 is fixedly mounted on the underside of the base 1 for carrying a pair of idler wheels 12 which may comprise rubber rollers, the wheels 12 being maintained at the same elevation as the friction roller 9. As shown in FIG. 5 for the left-hand idler wheel 12, a ratchet wheel 14, fixedly mounted on the arm 13, is inserted into the hollow space within the wheel 12 to mate with a plurality of balls 15, the arrangement being such that the idler wheel 12 freely rotates in the clockwise direction as indicated by an arrow shown, but is prevented from rotation in a counterclockwise direction. The right-hand idler wheel 12 is similarly constructed except that its rotation in the clockwise direction is prevented. At its other end, each of the arms 13 is held between a pair of leaf springs 16 having their opposite ends secured on respective projections 1b of the base 1, thus maintaning the arms 13 in a fixed orientation.

Referring to FIGS. 3 and 4, each engaging wheel 3 is formed with an arcuate slot 3a and a downwardly depending projection 3b, which extends through an arcuate slot 4a formed in the driven wheel 4 for engagement with one end of a resilient member such as a tension spring 18, the other end of which is fixed to a projection 4b mounted on the driven wheel 4. An L-shaped pawl lever 19 is mounted on the underside of the driven wheel 4 and is biased for oscillation in the clockwise direction, as viewed in FIG. 3, and carries an upwardly extending projection 19a which extends through the arcuate slot 3a. The driven wheel 4 is formed with an arcuate slot 4c through which are projection 19a extends. At its one end, the pawl lever 19 is formed with a pawl 19b which meshes with a ratchet wheel 20 which is freely mounted on the shaft 2 extending from the base. The ratchet wheel 20 is integrally formed with a radially extending arm 20a which is located below the body of the ratchet wheel. The free ends of the left- and right-side arms 20a engage the respective opposite ends of a rod-shaped actuating member 21 which is adapted to slide in the lateral direction, whereby a sliding movement of the member 21 actuates a switch 22 which controls the reversal or stopping of the motor 5.

In operation, when the motor is started in the condition shown in FIG. 1, the motor 5 rotates in the counterclockwise direction, as viewed in FIG. 1. Thereupon, the flywheel 10, as well as the drive wheel 8 and the friction roller 9 which are integral with the flywheel, rotate in the counterclockwise direction, causing the drive wheel 8 to rotate the left driven wheel 4, which is in peripheral contact therewith, in the clockwise direction. At this time, the projection 4b on the driven wheel 4 pulls the projection 3b of the engaging wheel 3 through the resilient member 18, but because the tension in the resilient member 18 is greater than the tape driving load of the cassette CA, the engaging wheel 3 is driven integral with the driven wheel 4 with the projection 3b being maintained in abutment against the end face of the slot 4a.

At this time, the pawl lever 19 is prevented from rocking as a result of the abutment of its projection 19a against the rear end face of the slot 3a, whereby the pawl 19a remains away from the ratchet wheel 20. While the left-hand idler wheel 12 is driven clockwise by the friction roller 9, it remains without effect during its rotation in this direction.

In this manner, the tape in the cassette CA runs from the right-hand to the left-hand reel to be taken up thereon, and when the tape is entirely withdrawn from the right-hand reel, there occurs a mementary increase in the tape driving load because the tape end is secured to the hub. Consequently, the left engaging wheel 4-1 is prevented from rotation, and the projection 3b is retracted relative to the driven wheel 4 while remaining within the slot 4a and causing an elongation of the resilient member 18. Thus, the projection 19a is released from abutment against the slot 3a. Then the pawl lever 19 rocks clockwise under the action of the bias applied thereto, causing the pawl 19b to mesh with the ratchet wheel 20, and the driven wheel 4 rocks the left-hand arm 20a clockwise. The actuating member 21 is fed to the left by the arm 20a, and reverses the motor 5 when the left-hand end is reached, by activating the actuator arm of the switch 22 to the left.

When the motor 5 is reversed, the drive wheel 8 and the friction roller 9 begin their rotation in the clockwise direction, whereby the left driven wheel 4 is driven counterclockwise to reduce the displacement from the engaging left wheel 3 and tends to rotate the left-hand idler wheel 12 counterclockwise, which however is prevented from rotation. As a consequence, the friction roller 9 rocks the oscillating arm 7 counterclockwise while rotating, and simultaneously the arm 13 is rocked counterclockwise under the bias applied by the leaf spring 16, driving the oscillating arm 7 to a position beyond the neutral point. Thereupon, the oscillating arm 7 is toggled to the opposite side under the resilience of the spring 17, bringing the driven wheel 8 into meshing engagement with the right driven wheel 4. Subsequently, the right-hand engaging wheel 3 is driven to take up the tape on the right-hand reel by an operation similar to that described above.

Thereafter when the tape has been entirely reeled off the left-hand reel, the actuating member 21 is urged by the arm 20a associated with the right-hand ratchet wheel 20 to be moved to the right, throwing the actuator arm of the switch 22 to the right to stop the motor 7. It should be understood that a repeated reversal can be achieved during the operation of the driving apparatus by employing a circuit arrangement such that a reversal occurs again when the actuator arm of the switch 22 is thrown to the right.

While, in the embodiment described above, a frictional roller transmission has been employed as transmission means between rotating members, it should be understood that a more reliable operation can be achieved by using a positive movement mechanism such as gears. It will be also noted that the drive wheel 8 may be directly coupled with the output shaft of the motor 5.

Alternatively, the idler wheel 12, which is adapted to rotate freely in one direction, may be replaced by a low friction wheel so that the engagement between the oscillating arm 7 and the arm 13 may drive the oscillating arm with a similar effect. The switch 22 may be actuated by any other suitable control means, as by connecting it directly with the arm 20a or forming the switch into a pair of sub-switches which are directly coupled with the respective arms 20a.

Other modifications can be made in the above described arrangement, as by providing the projection 4b of the driven wheel 4 on the pawl lever 19, using a common resilient member for causing the engagement and the rotation of the pawl lever 19, or replacing the engagement between the ratchet wheel 20 and the pawl 19b by a frictional engagement.

With the automatic reversal and stop mechanism according to the invention, there is no need for the provision of elements which detect the tape end and transmit a resulting movement, as found in the prior art, thus simplifying the overall arrangement. Since the material used for the various members can be limited to metals and resins, the reliability of operation is increased and the drive mechanism can be made in a more compact form.

What is claimed is:

1. An automatic reversal mechanism comprising:
   a. a pair of driven wheels,
   a drive roller supported for rotation in either direction and movable along a path between said wheels for peripheral engagement with selected one of said wheels,
   c. drive source means applying drive to said roller,
   d. means for moving said roller beyond a neutral position within said path in either direction in accordance with the direction of rotation of said roller,
   e. toggle means pressing said roller against one of said wheels to cause the peripheral engagement therewith upon the actuation of said moving means,
   f. a pair of engaging members supported concentrically with, and for relative rotation by a predetermined angle to, respective said wheels, for having exerted load thereon,
   g. resilient means connecting said wheels and engaging members, respectively, to cause an amount of relative rotation therebetween in response to the load exerted thereon, and
   h. means switching over the direction of rotation of said roller when the amount of such relative rotation reaches a predetermined value.

2. A mechanism according to claim 1 including a swingable arm supporting said drive roller for movement along said path.

3. A mechanism according to claim 1 wherein said moving means comprises a pair of swingable arms each having at one end thereof an idler roller one-directionally rotatably supported for engagement with said drive roller.

4. A mechanism according to claim 1 wherein said switching means comprises a pair of ratchet wheels supported for concentric rotation with respective said driven wheels and having an actuating lever for said switching over integrally attached thereto, and a pair of claw members supported on respective said driven wheels for swinging motion to be brought into meshing engagement with respective said ratchet wheels upon the occurrence of relative rotation of an amount beyond said predetermined value.

5. A mechanism according to claim 4 wherein said drive source means comprises a reversible electric motor, and said switching means comprises an electrical switch operative in response to the movement of said actuating lever for controlling the direction of rotation of said motor and for stopping the motor.

* * * * *